US008767834B2

(12) United States Patent
Segall et al.

(10) Patent No.: US 8,767,834 B2
(45) Date of Patent: Jul. 1, 2014

(54) METHODS AND SYSTEMS FOR SCALABLE-TO-NON-SCALABLE BIT-STREAM REWRITING

(75) Inventors: Christopher A. Segall, Camas, WA (US); Jie Zhao, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1151 days.

(21) Appl. No.: 12/019,127

(22) Filed: Jan. 24, 2008

(65) Prior Publication Data
US 2008/0219354 A1 Sep. 11, 2008

Related U.S. Application Data

(60) Provisional application No. 60/894,148, filed on Mar. 9, 2007.

(51) Int. Cl.
*H04N 7/12* (2006.01)

(52) U.S. Cl.
USPC ..................................... 375/240.23

(58) Field of Classification Search
USPC ..................................... 375/240.23
See application file for complete search history.

(56) References Cited

U.S. PATENT DOCUMENTS

| 5,500,677 A | 3/1996 | Fert et al. |
| 5,603,012 A | 2/1997 | Sotheran |
| 5,777,678 A | 7/1998 | Ogata et al. |
| 5,832,120 A | 11/1998 | Prabhakar et al. |
| 5,930,397 A | 7/1999 | Tsujii et al. |
| 6,057,884 A | 5/2000 | Chen et al. |
| 6,396,422 B1 | 5/2002 | Barkan |
| 6,400,996 B1 | 6/2002 | Hoffberg et al. |
| 6,490,320 B1 | 12/2002 | Vetro |
| 6,493,386 B1 | 12/2002 | Vetro |
| 6,574,279 B1 | 6/2003 | Vetro |
| 6,748,020 B1 | 6/2004 | Eifrig et al. |

(Continued)

FOREIGN PATENT DOCUMENTS

| EP | 0644695 | 3/1995 |
| EP | 0966162 | 12/1999 |

(Continued)

OTHER PUBLICATIONS

Joint Draft 9 of SVC Amendment; Draft ISO/IEC 14496-10 (2006); Joint Video Team (JVT) of ISO/IEC MPEG & ITU-T VCEG (ISO/IEC JTC1/SC29/WG11 and ITU-T SG16 Q.6); Document: JVT-V201; $22^{nd}$ Meeting: Marrakech, Morocco, Jan. 13-19, 2007.

(Continued)

*Primary Examiner* — Huy D Vu
*Assistant Examiner* — Benjamin Lamont
(74) *Attorney, Agent, or Firm* — Kristine Elizabeth Matthews; David C. Ripma

(57) ABSTRACT

Aspects of the present invention relate to systems and methods for selectively determining a quantization parameter based on coding parameters. In some embodiments, a quantization parameter selection may be based on the presence of non-zero transform coefficients as well as other parameters. Some embodiments relate to rewriting a multi-layer bitstream to a single-layer bitstream with a quantization parameter selected with reference to transform coefficients. Some embodiments convert a scalable, multi-layer video sequence into a single-layer, non-scalable video sequence that is compatible with legacy devices.

15 Claims, 4 Drawing Sheets

(56) References Cited

U.S. PATENT DOCUMENTS

| | | | |
|---|---|---|---|
| 6,765,931 | B1 | 7/2004 | Rabenko |
| 6,795,501 | B1 | 9/2004 | Zhu et al. |
| 6,829,301 | B1 | 12/2004 | Tinker et al. |
| 6,850,252 | B1 | 2/2005 | Hoffberg |
| 6,867,717 | B1 | 3/2005 | Ion et al. |
| 6,879,731 | B2 | 4/2005 | Kang et al. |
| 6,895,052 | B2 | 5/2005 | Hanamura et al. |
| 6,968,007 | B2 | 11/2005 | Barrau |
| 6,996,173 | B2 | 2/2006 | Wu |
| 7,003,034 | B2 | 2/2006 | Roh |
| 7,006,881 | B1 | 2/2006 | Hoffberg et al. |
| 7,010,174 | B2 | 3/2006 | Kang et al. |
| 2002/0054638 | A1 | 5/2002 | Hanamura et al. |
| 2002/0154694 | A1 | 10/2002 | Birch |
| 2003/0035488 | A1 | 2/2003 | Barrau |
| 2003/0043908 | A1 | 3/2003 | Gao |
| 2003/0058936 | A1 | 3/2003 | Peng et al. |
| 2003/0112863 | A1 | 6/2003 | Demos |
| 2003/0194007 | A1 | 10/2003 | Chen |
| 2004/0001547 | A1 | 1/2004 | Mukherjee |
| 2004/0151249 | A1 | 8/2004 | Morel |
| 2005/0013501 | A1 | 1/2005 | Kang et al. |
| 2005/0030315 | A1 | 2/2005 | Cohen et al. |
| 2005/0147163 | A1 | 7/2005 | Li |
| 2006/0002611 | A1 | 1/2006 | Mantiuk et al. |
| 2006/0077405 | A1 | 4/2006 | Topfer et al. |
| 2006/0083303 | A1 | 4/2006 | Han et al. |
| 2006/0126962 | A1 | 6/2006 | Sun |
| 2006/0153294 | A1 | 7/2006 | Wang et al. |
| 2006/0165304 | A1* | 7/2006 | Lee et al. ............... 382/240 |
| 2006/0200253 | A1 | 9/2006 | Hoffberg et al. |
| 2006/0200258 | A1 | 9/2006 | Hoffberg et al. |
| 2006/0200259 | A1 | 9/2006 | Hoffberg et al. |
| 2006/0200260 | A1 | 9/2006 | Hoffberg et al. |
| 2006/0209959 | A1 | 9/2006 | Sun |
| 2006/0210185 | A1 | 9/2006 | Sun |
| 2006/0221760 | A1 | 10/2006 | Chen |
| 2006/0230162 | A1* | 10/2006 | Chen et al. ............... 709/229 |
| 2006/0251330 | A1 | 11/2006 | Toth et al. |
| 2007/0025441 | A1* | 2/2007 | Ugur et al. ............. 375/240.03 |
| 2007/0071093 | A1* | 3/2007 | Shi et al. ............... 375/240.03 |
| 2007/0081588 | A1* | 4/2007 | Raveendran et al. ...... 375/240.1 |
| 2007/0140354 | A1 | 6/2007 | Sun |
| 2007/0160133 | A1 | 7/2007 | Bao et al. |
| 2007/0201560 | A1 | 8/2007 | Segall |
| 2007/0223580 | A1* | 9/2007 | Ye et al. ............... 375/240.12 |
| 2007/0230564 | A1* | 10/2007 | Chen et al. ............. 375/240.01 |

FOREIGN PATENT DOCUMENTS

| | | | |
|---|---|---|---|
| EP | 1170954 | A1 | 1/2002 |
| EP | 1195992 | A1 | 4/2002 |
| EP | 1248466 | A1 | 10/2002 |
| JP | 5-056271 | A | 3/1993 |
| JP | 7162870 | | 6/1995 |
| JP | 9070044 | | 3/1997 |
| JP | 9182085 | | 7/1997 |
| JP | 1018085 | | 1/1999 |
| JP | 11331613 | | 11/1999 |
| JP | 2000184337 | | 6/2000 |
| JP | 2004-363931 | A | 12/2004 |
| JP | 2005-80153 | | 3/2005 |
| JP | 2005-094054 | A | 4/2005 |
| JP | 2005-167431 | A | 6/2005 |

OTHER PUBLICATIONS

Rafal Mantiuk, Alexander Efremov, Karol Myszkowski, Hans-Peter Seidel. Backward Compatible High Dynamic Range MPEG Video Compression. In: Proc. of SIGGRAPH '06 (Special issue of ACM Transactions on Graphics). To appear. 2006.
Joint Video Team (JVT) of ISO/IEC MPEG & ITU-T VCEG, Advanced video coding for generic audiovisual services, ISO/IEC 14496-10, JVT-T201, Austria, Jul. 2006.
International Telecommunication Union, Series H: Audiovisual and Multimedia Systems; Coding of Moving Video; H.264, Mar. 2005.
Internation Telecommunication Union, ISO/IEC 13818-2 MPEG-2, Geneva, 1995.
International Organisation for Standardisation, MPEG-4 Version 2 Visual Working Draft Rev 5.0, Atlantic City, Oct. 1998.
International Telecommunication Union, Series H: Audiovisual and Multimedia Systems; Video coding for low bit rate communication; H.263, Geneva, Jan. 2005.
Yao-Chung Lin, Chung-Neng Wang, Tihao Chiang, Anthony Vetro, and Huifang Sun, "Efficient FGS to single layer transcoding", Digest of Technical Papers. International Conference on Consumer Electronics, 2002. ICCE. 2002, p. 134-135.
PCT/JP2007/064040 International Search Report.
Office action dated Sep. 3, 2008 for U.S. Appl. No. 11/776,430.
F. Durand and J. Dorsey, "Fast Bilateral Filtering for the Display of High-Dynamic-Range Images", Proceedings of SIGGRAPH, San Antonio, TX, Jul. 21-26, 2002.
R. Fattal, D. Lischinski and M. Werman, "Gradient Domian High Dynamic Range Compression", Proceedings of SIGGRAPG, San Antonio, TX, Jul. 21-26, 2002.
Andrew Segall, "SVC-to-AVC Bit-stream Rewriting for Coarse Grain Scalability", Joint Video Team(JVT) of ISO/IEC MPEG $ ITU-T VCEG (ISO/IEC JTC1/SC29/WG11 and ITU-T SG16 Q.6) 20$^{th}$ Meeting: Klagenfurt, Austria, Jul. 15-21, 2006, JVT-T061.
L. Meylan and S. Susstrunk, "High Dynamic Range Image Rendering with a Retinex-Based Adaptive Filter", IEEE Transactions on Image Processing, Sep. 2005.
S. Pattanaik, J. Ferwerda, M. Fairchild, D. Greenberg, "A multiscale Model of Adaptation and Spatial Vision for Realisitic Image Display", Proceedings of SIGGRAPH, Orlando, FL, Jul. 19-24, 1998.
E. Reinhard, M. Stark, P. Shirley and J. Ferwerda, "Photographic Tone Reproduction for Digital Images", Proceedings of SIGGRAPH, San Antonio, TX, Jul. 21-26, 2002.
G. Ward Larson, H. Rushmeier and C. Piatko, "A visibility Matching Tone Reproduction Operator for High Dynamic Range Scenes", IEEE Transactions on Visualization and Computer Graphics, 3(4), Oct.-Dec. 1997, pp. 291-306.
Brightside Technologies, Inc., "DR37-P: Detailed Preliminary Specifications—V2.0", http://www.brightsidetech.com/products/info/dr37p_specs.pdf.
Y Li, L. Sharan and e. Adelson, "Compressing and Companding High Dynamic Range Images with Subband Architectures", ACM Transactions on Graphics (Proceedings of SIGGRAPH '05), vol. 24, No. 3, Jul. 2005.
R. Mantiuk, G. Krawczyk, K. Myszkowski and H.P. Seidel, "Perception-motivated High Dynamic Range Video Encoding", ACM Transactions on Graphics (Special Issue: Proceedings of SIGGRAPH '04), vol. 23, No. 3, Aug. 2004.
H. Seetzen, W. Heidrich, W. Stuerzlinger, G. Ward, L. Whitehead, M. Trentacoste, A. Ghosh, A. Vorozcovs, "High Dynamic Range Display Systems", ACM Transactions on Graphics (Special Issue: Proceedings of SIGGRAPH '04), vol. 23, No. 3, Aug. 2004.
H. Seetzen, G. Ward, and L. Whitehead, "High Dynamic Range Display Using Low and High Resolution Modulators," The Society for Information Display International Symposium, Baltimore, Maryland, May 2003.
G. Ward and M. Simmons, "JPEG-HDR: A Backwards-Compatible, High Dynamic Range Extension to JPEG," Proceedings of the Thirteenth Color Imaging Conference, Scottsdale, AZ, Nov. 2005.
International Search Report for International Application No. PCT/JP2007/050277.
Joint Video Team (JVT) of ISO/IEC MPEG & ITU-T VCEG, (ISO/IEC JTC1/SC29/WG11 and ITU-T SG16 Q.6), Working Draft 1.0 of 14496-10:200x/AMD1 Scalable Video Coding International Organization for Standardization, Organisation Internationale Normalisation, Coding of Moving Pictures and Audio, ISO/IEC JTC 1/SC 29/WG 11 N6901, Jan. 2005, Hong Kong, China relevant section 5 and 6.
Joint Video Team of ITU-T VCEG and ISO/IEC MPEG, "Advanced Video Coding (AVC)—4th Edition," ITU-T Rec. H.264 and ISO/IEC 14496-10 (MPEG-4 Part 10), Jan. 2005 section 8.4.2.2.1.

(56) References Cited

OTHER PUBLICATIONS

Julien Reichel, Heiko Schwarz and Mathias Wien, "Scalable Video Coding—Working Draft 4", JVT-Q201, NICE, FR, Oct. 2005.
European Search Report—PCT/JP2007/064040—EP 07 76 8418—Date Sep. 13, 2011.
Mei Kodama and Shunya Suzuki, "Scalable Video Transcoding Method with Spatial Updatable Scalability," IEEE International Midwest Symposium on Circuits and Systems, Jul. 25, 2004, vol. 1, p. 1_257-1_260.
James Macnicol, John Arnold, and Michael Frater, "Scalable Video Coding by Stream Morphing," IEEE Transactions on Circuits and Systems for Video Technology, Feb. 2005, P. 306-319, vol. 15, No. 2.
International Search Report—PCT/JP2008/054687—mailing date Jul. 22, 2008.
First Office Action—State Intellectual Property Office of People's Republic of China—Application No. 200780031669.5—issuing date Sep. 10, 2010.
Andrew Segall, SVC-to-AVC Bit-stream Rewriting for Coarse Grain Scalability, Joint Video Team (JVT) of ISO/IEC MPEG & ITU-T VCEG (ISO/IEC JTC1/SC29/WG11 and ITU-T SG16 Q.6), 20th Meeting: Klagenfurt, Austria, Jul. 15-21, 2006.
European Search Report—EP 08 72 2084—dated May 24, 2011.
Danny Hong and Alex Eleftheriadis, Modified Deblocking Filter Process in Scalable Extension (Rev. 1), Joint Video Team (JVT) of ISO/IEC MPEG & ITU-T VCEG (ISO/IEC JTC1/SC29/WG11 and ITU-T SG16 Q.6), 23rd Meeting: San Jose, California, USA, Apr. 21-27, 2007.
Joint Draft ITU-T Rec. H.264 | ISO/IEC 14496-10 / Amd.3 Scalable video coding, Editor(s) Wiegand et al., 24th Meeting: Geneva, Switzerland, Jun. 29, 2007-Jul. 5, 2007 paragraph [G.8.7.3].
Japanese Office Action—Patent Application No. 2009-519132—Mailing Date Aug. 21, 2012.
Kodama and Suzuki, "Scalable Video Transcoding Method with Spatial Updatable Scalability," The 47th IEEE International Midwest Symposium on Circuits and Systems 2004, Jul. 25, 2004, vol. 1, pp. I-257-I-260.
Japanese Office Action—Patent Application No. 2009-519132—Mailing Date Mar. 21, 2012.
Japanese Office Action—Patent Application No. 2009-538936—Mailing Date Mar. 21, 2012.
Thomas Wiegand, "Joint Draft ITU-T Rec. H.264 | ISO/IEC 14496-10 / Amd.3 Scalable video coding,", Joint Video Team (JVT) of ISO/IEC MPEG & ITU-T VCEG ( ISO/IEC JTC1/SC29/WG11 and ITU-T SG16 Q.6) 24th Meeting: Geneva, Switzerland, Oct. 26, 2007, [JVT-X201].

\* cited by examiner

METHODS AND SYSTEMS FOR SCALABLE-TO-NON-SCALABLE BIT-STREAM REWRITING

RELATED REFERENCES

This application claims the benefit of U.S. Provisional Patent Application No. 60/894,148, entitled "Methods and Systems for Quantizer Management for SVC-to-AVC Bit-Stream Rewriting," filed on Mar. 9, 2007.

FIELD OF THE INVENTION

Embodiments of the present invention relate to methods and systems for selecting a quantization parameter based on transform coefficients and, in some embodiments, other parameters. Some embodiments may also rewrite a scalable bit-stream to a non-scalable bitstream. Some embodiments comprise methods and systems for rewriting a JVT SVC-compliant bitstream to a JVT AVC-compliant bitstream.

BACKGROUND

The "Advanced Video Coding" (AVC) standard is achieving large market penetration. Other names for AVC include H.264, H.26L and MPEG-4, part 10. The AVC standard is put forth by the JVT/MPEG standardization body. Scalable Video Coding (SVC) is a project currently active in the JVT/MPEG standardization body. Exemplary embodiments of the present invention may relate to scalable video extensions, including SVC, for the AVC|H.264 video coding standards.

The current state of these SVC extensions is problematic when a multiple layer bit-stream, that contains non-zero transform coefficient level values is rewritten to a single layer representation of the block that contains only zero value transform coefficient level values.

SUMMARY

Some embodiments of the present invention comprise methods and systems for selecting a quantization parameter based on the presence of non-zero transform coefficients and, in some cases, other parameters.

In some embodiments of the present invention, a scalable bit-stream may be rewritten to a non-scalable bit-stream without full reconstruction of the sequence. In some embodiments, a multiple layer bit-stream may be rewritten to a single layer bit-stream without degradation and without completely reconstructing the transmitted image sequence. Some embodiments consider the specific problem of a macroblock, within the multiple layer bit-stream, that contains non-zero transform coefficient level values. However, the single layer representation of the block contains only zero value transform coefficient level values.

Some embodiments of the present invention handle the special case of a single layer block that contains only zero transform coefficient level values but is transmitted with non-zero transform coefficient level values in multiple layers of the scalable bit-stream.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
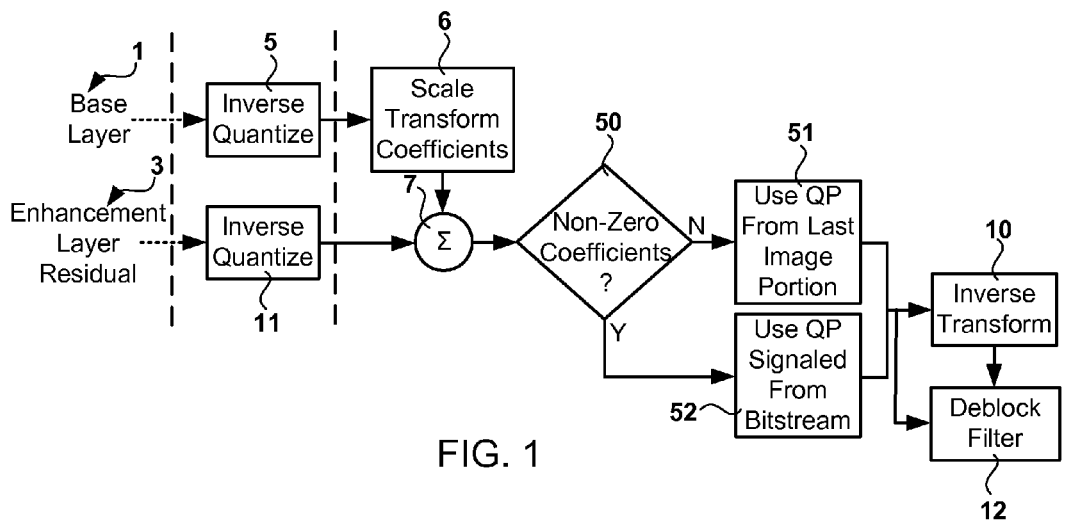
FIG. 1 is a diagram showing embodiments of the present invention comprising scaling of transform domain coefficients.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

In this document, SVC denotes the "Scalable Video Coding" project currently active in the JVT/MPEG standardization body. AVC denotes the "Advanced Video Coding" standard that is achieving large market penetration. Other names for AVC include H.264, H.26L and MPEG-4, part 10. Exemplary embodiments of the present invention may relate to scalable video extensions for the AVC|H.264 and other video coding standards. Some of these extensions are commonly known as SVC, and an SVC system description, described in T. Wiegand, G. Sullivan, J. Reichel, H. Schwarz and M. Wien, "Joint Draft 9 of SVC amendment (revision 2)", JVT-V201, Marrakech, Morocco, Jan. 13-19, 2007; is incorporated herein by reference.

ISO/IEC JTC1/SC29/WG11 Information Technology—Coding of Audio-Visual Objects—Part 10: Advanced Video Coding, ISO/IEC 14496-October 2005, is also incorporated herein by reference.

ITU-T Recommendation H.264: "Advanced video coding for generic audio visual services", March 2003, is also incorporated herein by reference.

In some embodiments of the present invention, a multiple layer bit-stream may be rewritten to a single layer bit-stream without degradation and without completely reconstructing the transmitted image sequence. Some embodiments solve the specific problem of a macro-block within the multiple layer bit-stream that contains non-zero transform coefficient level values, but, when rewritten to a single layer bit-stream, contains only zero value transform coefficient level values. As will be disclosed in this document, this scenario requires special handling.

The current SVC system requires transcoding to support an AVC device at any layer besides the baselayer. Embodiments of the present invention change the syntax and semantics of the coarse grain scalable layer. These changes enable the rewriting of an SVC bit-stream into an AVC-compliant bit-stream. That is, in some embodiments, a network device can rewrite the SVC data into an AVC bit-stream without drift and without needing to reconstruct the intensity values of the sequence. This may be accomplished by merging multiple coarse grain scalable layers. In some embodiments, rewriting may comprise reading image data from a first layer or bit-stream and storing that data in a second or alternative bit-stream.

Some embodiments may comprise:
1. A modified definition for the quantization parameter for in-loop filtering; and
2. A modified definition for the quantization parameter written to the single layer bit-stream In the exemplary embodiments described in detail in this specification, the focus is on SVC to AVC bit-stream rewriting. Other embodiments may comprise the use of other video coding standards and extensions. The SVC to AVC bit-stream rewriting process may comprise taking an SVC bit-stream as input and producing an AVC bit-stream as output. Conceptually, this is similar to transcoding. However, some embodiments may exploit the single loop structure of SVC and enable the direct mapping of an SVC bit-stream onto AVC syntax elements. In some embodiments, this may be done without introducing drift and without reconstructing the intensity values of the video sequence.

Inter-Coded Blocks

Some embodiments of the present invention work specifically with inter-coded blocks. These embodiments may comprise one or more of the following processes and limitations:
1. Blocks that are inferred from baselayer blocks must utilize the same transform as the baselayer block. For example, if a block in the coarse grain scalable layer has base_mode_flag equal to one and the co-located base-layer block utilizes the 4×4 transform, then the enhancement layer block must also utilize a 4×4 transform.
2. The reconstruction of a block that is inferred from base-layer blocks and utilizes residual prediction shall occur in the transform domain. Currently, the baselayer block would be reconstructed in the spatial domain and then the residual transmitted in the enhancement layer. Here, the transform coefficients of the baselayer block are scaled at the decoder, refined by information in the enhancement layer and then inverse transformed.
3. The smoothed_reference_flag shall be zero when the avc_rewrite flag is one.

Intra-Coded Blocks

Some embodiments of the present invention work specifically with Intra-coded blocks. Intra-coded blocks provide additional barriers to the SVC-to-AVC rewriting problem. Within the coarse grain scalability (CGS) system, a block in the enhancement layer may be coded with the IntraBL mode. This mode signals that the intra-coded block in the baselayer should be decoded and used for prediction. Then, additional residual may be signaled in the enhancement layer. Within the SVC-to-AVC rewriting system, this creates difficulties since the reconstructed intra-coded block can not be described as a spatial prediction of its neighbors plus a signaled residual. Thus, the intra-coded block must be transcoded from SVC to AVC. This requires added computational complexity; it also introduces coding errors that may propagate via motion compensation.

Some embodiments of the present invention may be described with reference to FIG. 1. In these embodiments, a base layer 1 and enhancement layer residual 3 are received at a decoder or rewriter. The base layer data may be inverse quantized 5 and the transform coefficients may be scaled 6 to match a characteristic of the enhancement layer. In some embodiments, the matched characteristic may comprise a quantization parameter characteristic. The enhancement layer residual 3 may also be inverse quantized 11 and added 7 to the scaled base residual coefficients to create combined coefficients. These combined coefficients may then be analyzed to determine 50 whether non-zero transform coefficients are present. If non-zero transform coefficients are present, a quantization parameter signaled in the bitstream may be used for processing 52 that portion of the image. If no non-zero transform coefficients are present, a quantization parameter from a previous or last image portion 51 may be used for processing that portion of the image.

In some embodiments, the combined coefficients are then inverse transformed 10 to produce spatial domain intensity values. In some embodiments, the base layer information may be ignored when it is not needed. The spatial domain intensity values may then be filtered 12 to remove blocking artifacts or for other reasons. This filtering may utilize or be dependent on the quantization parameter selected 51, 52 with reference to non-zero transform coefficients.

Figure 2:
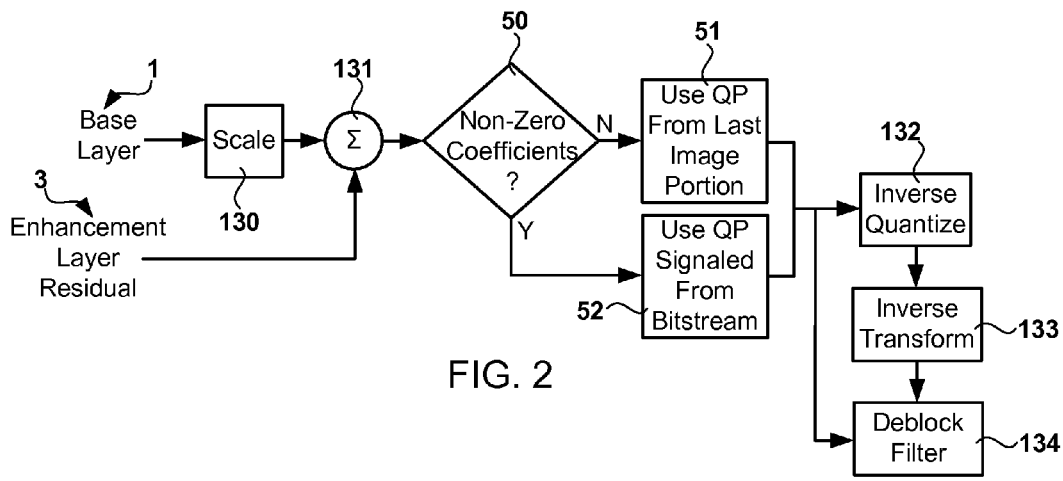
FIG. 2 is a diagram showing embodiments of the present invention comprising accumulation of quantized transform coefficients and scaling of quantized transform domain coefficients.

Some embodiments of the present invention may be described with reference to FIG. 2. In these embodiments, a base residual 1 and enhancement layer residual 3 are received at a decoder or rewriter. In these embodiments, the base layer quantized transform coefficients 1 may be scaled 130 to match a characteristic of the enhancement layer. In some embodiments, the matched characteristic may comprise a quantization parameter characteristic. The enhancement-layer quantized transform coefficients 3 may be added 131 to the scaled base-layer quantized transform coefficients to create combined quantized coefficients. These combined quantized coefficients may then be analyzed to determine 50 whether non-zero transform coefficients are present. If non-zero transform coefficients are present, a quantization parameter signaled in the bitstream may be used for processing 52 that portion of the image. If no non-zero transform coefficients are present, a quantization parameter from a previous or last image portion 51 may be used for processing that portion of the image.

The combined quantized coefficients may then be inverse quantized 132 to produce de-quantized combined coefficients, which may then be inverse transformed 133 to produce combined spatial domain values. These spatial domain values may then be filtered 134 to remove blocking artifacts and other artifacts. This filtering 134 may utilize the quantization parameter selected 51, 52 earlier in the process.

To address the problem of the IntraBL block in SVC-to-AVC rewriting, embodiments of the present invention comprise an alternative method for generating the prediction within an IntraBL block. The process no longer requires the baselayer block to be reconstructed. Instead, the intra prediction mode and transmitted residual are directly copied to the enhancement layer. This may be described with reference to FIGS. 3 and 4.

Figure 3:
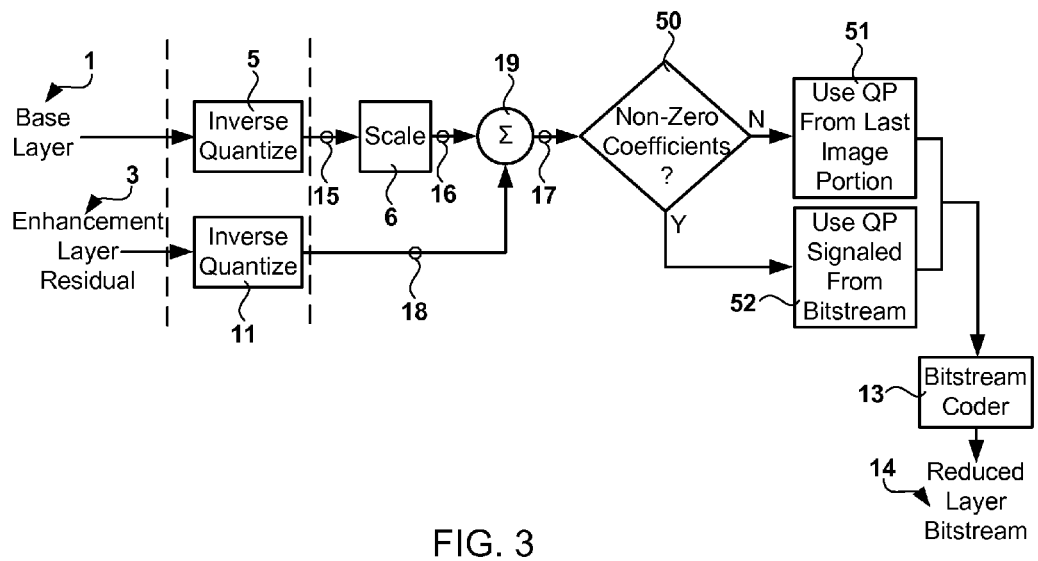
FIG. 3 is a diagram showing embodiments of the present invention comprising scaling of transform domain coefficients and bitstream rewriting without reconstruction.

Some embodiments of the present invention may be described with reference to FIG. 3. In these embodiments, the bitstream is re-encoded without complete reconstruction of the image. In these embodiments, base layer (BL) data 1 may be received at a decoder, transcoder, decoder portion of an encoder or another device or module. Enhancement layer (EL) data 3 may also be received at the device or module. In these embodiments, the BL residual 1 may be inverse quantized 5 to produce BL transform coefficients. These BL transform coefficients may then be scaled 6 to match a characteristic of the enhancement layer. In some embodiments, this enhancement layer characteristic may be a quantization parameter, a resolution parameter or some other parameter that relates the base layer to the enhancement layer. The enhancement layer data 3 may also be inverse quantized 11 to produce enhancement layer coefficients 18. The scaled BL coefficients 16 may then be combined 19 with the EL coefficients 18 to produce combined coefficients 17.

These combined coefficients may then be analyzed to determine 50 whether non-zero transform coefficients are present. If non-zero transform coefficients are present, a quantization parameter signaled in the bitstream may be used for processing 52 that portion of the image. If no non-zero transform coefficients are present, a quantization parameter from a previous or last image portion 51 may be used for processing that portion of the image.

These combined coefficients may then be rewritten to a reduced-layer or single-layer bitstream with a bitstream encoder 13. In some embodiments, the bitstream encoder 13 may also write prediction data into the bitstream. The functions of bitstream encoder 13 may also comprise quantization, entropy coding and other functions.

Figure 4:
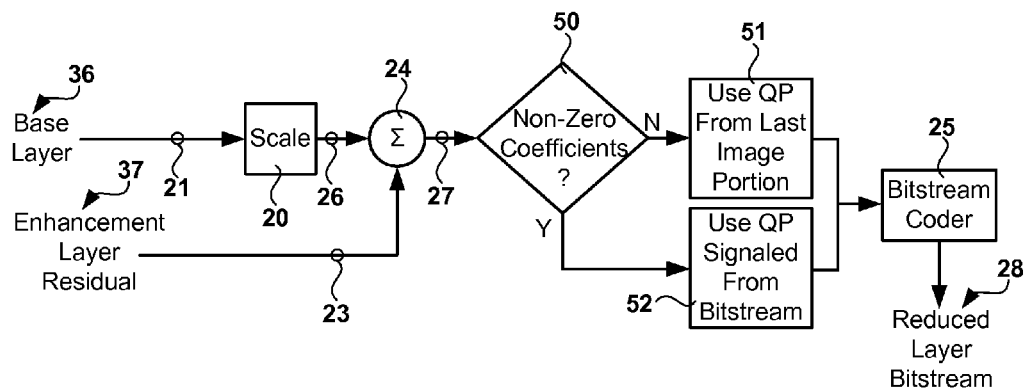
FIG. 4 is a diagram showing embodiments of the present invention comprising accumulation of quantized transform coefficients or indices and bitstream rewriting without reconstruction.

Some embodiments of the present invention may be described with reference to FIG. 4. In these embodiments, the bitstream is re-encoded without complete reconstruction of the image and without inverse quantization. In these embodiments, base layer (BL) data 36 may be received at a decoder, transcoder, decoder portion of an encoder or another device or module. Enhancement layer (EL) data 37 may also be received at the device or module. In these embodiments, the BL signal 36 and enhancement layer signal 37 may be entropy decoded to produce quantized coefficients or indices 21 and 23. The BL quantization indices 21 may then be scaled 20 to match a characteristic of the enhancement layer. In some embodiments, this enhancement layer characteristic may be a quantization parameter, a resolution parameter or some other parameter that relates the base layer to the enhancement layer. The scaled BL indices 26 may then be combined 24 with the EL indices 23 to produce combined indices 27.

These combined indices 27 may then be analyzed to determine 50 whether non-zero indices are present. If non-zero indices are present, a quantization parameter signaled in the bitstream may be used for processing 52 that portion of the image. If no non-zero indices are present, a quantization parameter from a previous or last image portion 51 may be used for processing that portion of the image.

These combined indices may then be rewritten to a reduced-layer or single-layer bitstream 28 with a bitstream encoder 25. In some embodiments, the bitstream encoder 25 may also write prediction data 35 into the bitstream. The functions of bitstream encoder 25 may also comprise quantization, entropy coding and other functions.

In these embodiments, the base layer block does not need to be completely reconstructed. Instead, the intra-prediction mode and residual data are both mapped to the enhancement layer. Then, additional residual data is added from the enhancement layer. Finally, the block is reconstructed. The advantage of this approach is that the enhancement block may be written into a single layer bit-stream without loss and without requiring the base layer to be completely decoded.

As can be seen from these figures, some embodiments re-map the intra prediction mode and residual data directly from the baselayer to an enhancement layer without reconstructing the block. Then, additional residual information in the enhancement bit-stream is (optionally) decoded. Finally, the block is reconstructed and refined at the highest quality level.

Some embodiments of the present invention do not use a residual prediction flag.

Figure 5:
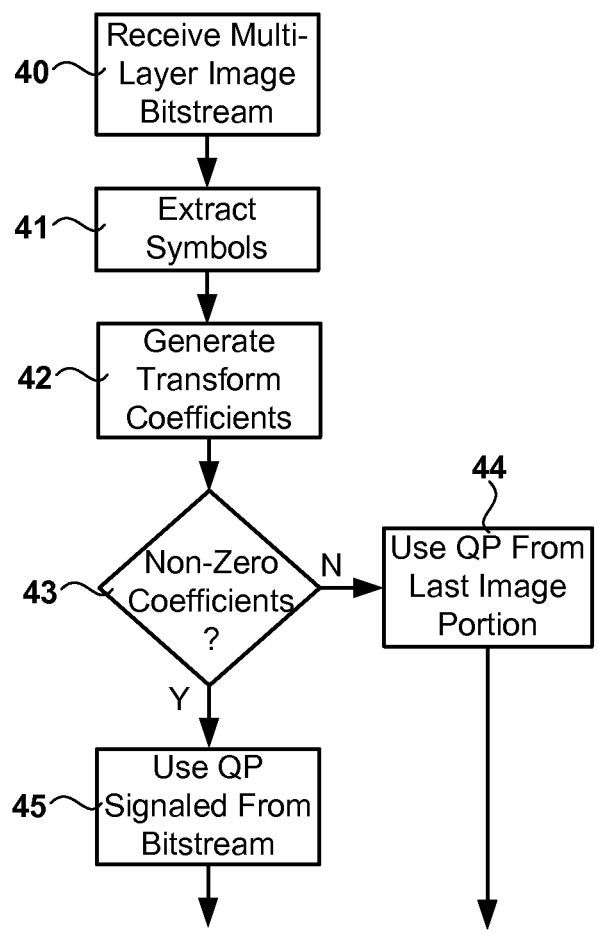
FIG. 5 is a diagram showing embodiments of the present invention wherein a quantization parameter is selected based on transform coefficients.

In some embodiments, changes to current methods comprise:
1. A modified IntraBL method that propagates the intra prediction mode from the baselayer to the enhancement layer. Intra prediction is then performed at the enhancement layer.
2. Semantic requirement that the transform type for IntraBL blocks must be the same as the co-located baselayer block. For example, if the baselayer block employs the 8×8 transform, then the enhancement layer block must also utilize the 8×8 transform.
3. To enable the independent processing of the bit-stream, an 8×8 transform flag may still be transmitted in the enhancement layers.
4. Blocks coded by the 16×16 transform in the baselayer are also coded by the 16×16 transform in the enhancement layer. However, the enhancement layer blocks are transmitted with the 4×4 scan pattern and method. That is, the DC and AC coefficients of the 16×16 blocks are not sent separately Some embodiments of the present invention may be described with reference to FIG. 5. In these embodiments, a multi-layer image bitstream is received 40. This will typically occur at a decoder or bitstream rewriter. Symbols are then extracted 41 from the multi-layer bitstream. This may be performed by inverse entropy coding or other processes. The symbols are then used to generate transform coefficients 42. These transform coefficients may then be analyzed. This analysis may comprise a determination 43 of whether there are any non-zero transform coefficients. If non-zero transform coefficients are present in the decoded bitstream for the current portion of an image, a quantization parameter that was signaled in the bitstream 45 may be used for processing of that portion of the image. If no non-zero transform coefficients are present, a quantization parameter used for a previous portion of the image 44 may be used as a default quantization parameter for the current image portion. The quantization parameter selected in this process may then be used for processing of the current image portion. In some embodiments, this processing may comprise de-quantization of the current image portion. In some embodiments, this processing may comprise in-loop filtering of the current image portion. In some embodiments, this processing may comprise signaling of a quantization parameter offset for a subsequent image portion.

Quantizer Management

One difficulty that arises in the above system is that the transform coefficients of the reconstructed image are derived by mapping transform coefficient level values in a lower layer of the bit-stream to the reconstructed layer and then adding signaled refinement. As part of this mapping process, the quantization parameters of the lower layer and reconstructed layer play a critical role in the defining the mapping operator.

In a state-of-the-art video encoding system, the quantization parameters at the lower layer and reconstructed layer may be spatially varying. This allows an encoder to adapt the rate and/or quality of the video sequence within each image frame. This is incorporated into the AVC and SVC system specification, and it is accomplished by transmitting a quantization offset parameter for each macroblock. This quantization offset parameter defines the difference between the quantization parameter for the current block and a previous quantization parameter. This previous quantization parameter may be the quantization parameter of a previous block, a quantization parameter signaled at the slice layer, or any other definition of a previous quantization parameter.

To improve coding efficiency, the quantization offset parameter may be inferred from other information in a bit-stream. Specifically, the AVC and SVC specification define that the quantization offset parameter shall be zero when the macroblock does not contain quantized transform coefficients (also known as transform coefficient levels or transform coefficient level values). In this case, the current AVC and SVC specification defines that the quantization offset parameter is not present in the bit-stream for macroblocks with only zero value transform coefficient levels.

Restricting the transmission of the quantization offset parameter complicates the bit-stream rewriting system. Specifically, consider the following scenario: (1) a block is transmitted in the lower layer with one or more non-zero transform coefficient levels, (2) a block is transmitted in the layer to be reconstructed that predicts the transform coefficient levels from the lower layer block, (3) the block in the reconstructed layer contains transform coefficient level values that are non-zero, (4) the block in the reconstructed layer contains a non-zero quantization offset parameter, and (5) the addition of the predicted transform coefficient levels and the transmitted transform coefficient levels results in only zero value transform coefficient levels.

In the case described in the previous paragraph, the bit-stream rewriting invention is unable to create a single layer bit-stream that perfectly matches the multi-layer bit-stream. This is due to the fact that the block in the enhancement layer bit-stream contains a quantization parameter that differs from the previous quantization parameter. However, the single layer bit-stream is forbidden to have a quantization parameter that differs from the previous quantization parameter for this block location. This is because the single layer version of the block does not contain non-zero transform coefficient level values. The result is that drift is introduced between the single layer and multi-layer decoded output, as the quantization parameters for each block effect the output of the in-loop filtering operations.

Embodiments of the present invention address this problem. Some embodiments operate as follows: First, the multi-layer decoder decodes the entropy codes for each lower layer and reconstruction/enhancement layer macroblock. At every macroblock, the decoder then predicts the transform coefficient level values for the reconstruction/enhancement layer block from the lower layer block (when signaled to utilize this process within the bit-stream). Prediction is performed utilizing the quantization parameter for the lower layer and reconstruction/enhancement layer that are signaled within the bit-stream. Second, the multi-layer decoder computes the number of non-zero transform coefficients. This may be represented by a coded block pattern, as is defined in the incorporated AVC and SVC specifications, or any other data representation. Third, for blocks that do not contain non-zero transform coefficients, the multi-layer decoder identifies the previous quantization parameter. As a reminder, this assumes a suitable definition for the previous. For example, in some embodiments, if no macroblock in the current picture has been reconstructed, the previous quantization parameter may be set to be the slice quantization parameter. Fourth, this previous quantization parameter is utilized by the in-loop filtering operation when operating on the current block. Fifth, this previous quantization parameter is utilized for signaling the quantization offset parameter for subsequent blocks.

Example pseudo code for an exemplary embodiment of the present invention is:

```
if ((rcMbDataAccess.getSH( ).getAVCRewriteFlag( )
&&(rcMbDataAccess.getSH( ).getBaseLayerId( ) !=
MSYS_UINT_MAX))
  {
    if(( rcMbDataAccess.getMbData( ).getMbExtCbp( ) == 0 ) &&
(!rcMbDataAccess.getMbData( ).isIntra16x16( )))
      rcMbDataAccess.getMbData( ).setQp(
rcMbDataAccess.getLastQp( ));
  }
```

Where, in this exemplary embodiment, the current quantization parameter is set equal to the last quantization parameter when (i) there are no non-zero transform coefficients (e.g., the coded block pattern is zero), (ii) the block mode is not Intra 16×16 or (iii) other conditions.

An alternative embodiment operates as follows. At every macroblock, an encoder computes the number of non-zero transform coefficients in the single layer representation. For blocks that contain only zero transform coefficients in the single layer representation, the encoder restricts the quantization offset parameter to be zero within the enhancement layer bit-stream.

Some embodiments of the present invention may comprise methods and systems that accept the following inputs:
a one-dimensional array mbType with PicSizeInMbs elements specifying macroblock types for the macroblocks of the current decoded or partly decoded dependency representation,
a one-dimensional array tQPy with PicSizeInMbs elements specifying luma quantisation parameters for the macroblocks of the current decoded or partly decoded dependency representation,
a (PicSizeInMbs)×(256+2*MbWidthC*MbHeightC) array tCoeffLevel specifying transform coefficient level values for the macroblocks of the current decoded or partly decoded dependency representation.

Outputs of these embodiments may comprise:
a one-dimensional array $qpDB_Y$ with PicSizeInMbs elements specifying luma quantization parameters used in the deblocking filter process for the macroblocks of the current decoded or partly decoded dependency representation,
when ChromaArrayType is not equal to 0, two one-dimensional arrays $qpDB_{Cb}$ and $qpDB_{Cr}$ with PicSizeInMbs elements specifying chroma quantization parameters used in the deblocking filter process for the macroblocks of the current decoded or partly decoded dependency representation.

The macroblock address mbAddr proceeds over the values 0 . . . (PicSizeInMbs−1), and for each value of mbAddr, the following ordered steps are specified.

THE VARIABLE $qpDB_Y$[MBADDR] IS DERIVED AS FOLLOWS.
If mbType[mbAddr] is equal to I_LPCM, $qpDB_Y$[mbAddr] is set equal to 0.
Otherwise, if tcoeff_level_prediction_flag is equal to 1, mbAddr is greater than 0, mbType[mbAddr] is not equal to I_16×16, and all elements tCoeffLevel[mbAddr][i] with i=0 . . . (255+2*MbWidthC*MbHeightC) are equal to 0, $qpDB_Y$[mbAddr] is set equal to $qpDB_Y$[mbAddr−1].
Otherwise, $qpDB_Y$[mbAddr] is set equal to $tQP_Y$[mbAddr].

Figure 6:
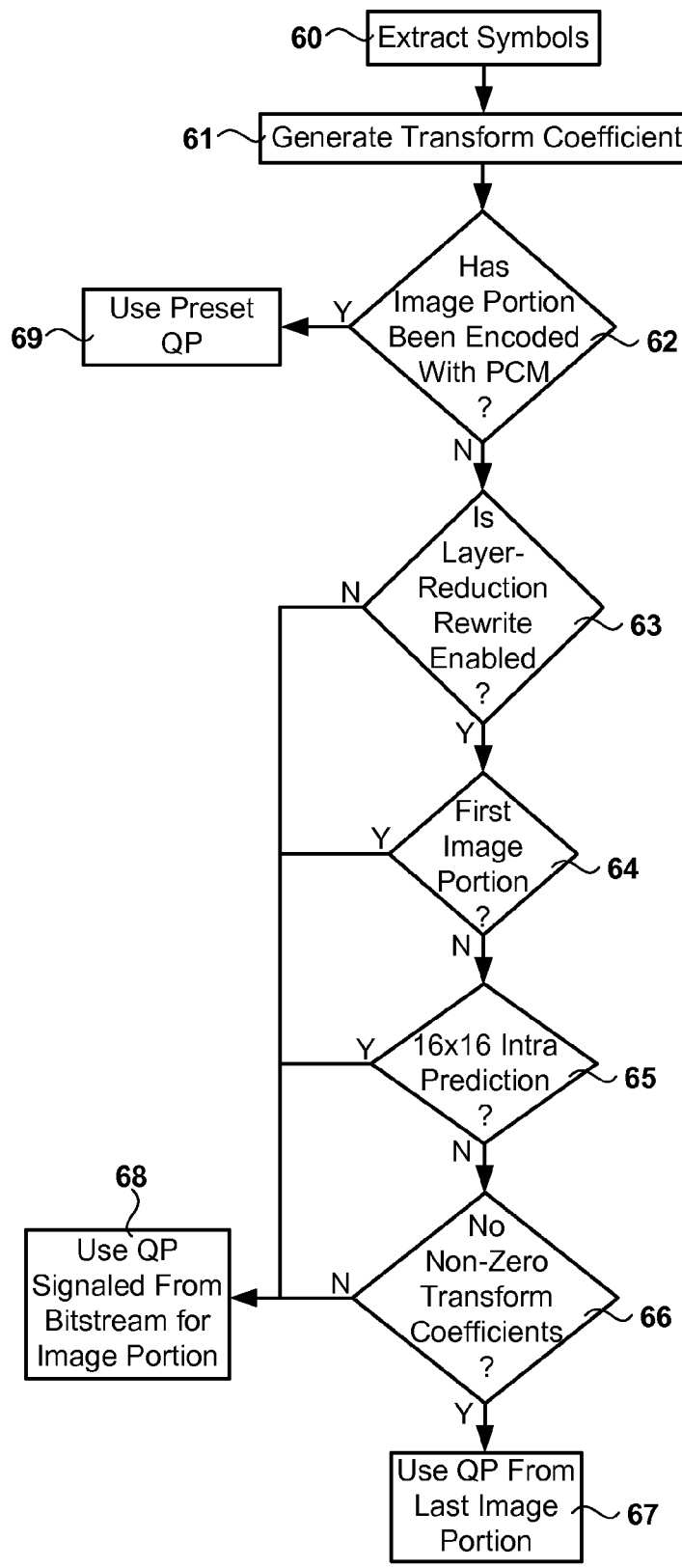
FIG. 6 is a diagram showing embodiments of the present invention wherein a quantization parameter is selected based on transform coefficients and other parameters.

Some embodiments of the present invention may be described with reference to FIG. 6. In these embodiments, symbols are extracted 60 from a multi-layer bitstream. Transform coefficients are then generated 61 from the extracted symbols. It is then determined whether several conditions are satisfied. A first determination 62 is made to ascertain whether the current image portion has been encoded directly without transformation. In some embodiments, this determination 62 may be made by reading a system I_PCM flag. If an image portion has been encoded directly, a predetermined quantization parameter may be used 69. This condition is satisfied if the current image portion is not encoded directly.

In some embodiments, a second determination may also be made 63, wherein it is determined whether a layer-reduction-rewrite feature is enabled. In some embodiments, this step may determine whether a multi-layer-to-single-layer rewrite process is enabled. In some embodiments, this step may comprise determining if a tcoeff_level_prediction_flag is set. This condition is satisfied if the layer-reduction-rewrite is enabled.

In some embodiments, a third determination may be made 64, wherein it is determined whether the current image portion is the first image portion. In some embodiments, this process may determine whether the current image portion is the first slice in a frame. In some embodiments, this process may be performed by reading a macro-block address. In some embodiments, this may be determined by reading a [mbaddr] flag. This condition is satisfied if the current image portion is not the first portion of an image element.

In some embodiments, a fourth determination may also be made 65, wherein it is determined whether the current image portion was encoded with intra-prediction using a 16×16 block size. In some embodiments, this step may comprise reading a macro-block-type flag. This condition is satisfied if the 16×16 intra-prediction mode is not used.

In some embodiments, a fifth determination may also be made 66. In these embodiments, it may be determined whether non-zero transform coefficients are present in the transform coefficients generated 61 from the extracted symbols 60. In some embodiments, this may be performed by counting non-zero transform coefficients generated from the bitstream for the current image portion. This condition is satisfied if there are no non-zero transform coefficients in the current image portion.

In some embodiments of the present invention, when one or more or these determinations are made, a quantization parameter may be set based on the determination. In some embodiments, if all of the first through fifth conditions are satisfied, a quantization parameter from a last image portion may be used for processing the current image portion. In some embodiments, if any of the second through fifth conditions are not met, a quantization parameter signaled in the current image portion bitstream may be used for processing the current image portion.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for image bitstream processing, said method comprising:
   extracting symbols from a multi-layer image bitstream, said symbols being related to an image portion;
   generating combined transform coefficients from said symbols, wherein said combined transform coefficients are a combination of enhancement layer coefficients and base layer coefficients;
   determining whether said combined transform coefficients comprise any non-zero coefficients;
   when said combined transform coefficients comprise a non-zero coefficient, using a quantization parameter identified in said symbols for processing said image portion; and
   when said combined transform coefficients do not comprise a non-zero coefficient, using a default quantization parameter, wherein said default quantization parameter is a quantization parameter used for a previous image portion, for processing said image portion.

2. A method as described in claim 1 wherein said processing said image portion comprises in-loop filtering.

3. A method as described in claim 1 wherein said processing said image portion comprises signaling a quantization offset parameter for a subsequent image portion.

4. A method as described in claim 1 further comprising scaling said base layer coefficients and combining said scaled base layer coefficients with said enhancement layer coefficients to form said combined transform coefficients.

5. A method as described in claim 1 wherein said image portion is an image block.

6. A method as described in claim 1 further comprising storing the quantization parameter selected for said processing as a default quantization parameter for a next image portion.

7. A method as described in claim 1 wherein said processing comprises storing said combined transform coefficients in a second bitstream.

8. A method as described in claim 1 further comprising determining image intensity values based on said combined transform coefficients and filtering said image intensity values.

9. A method for combining a bitstream base layer with a bitstream enhancement layer in a multi-layer bitstream, said method comprising:
   a) generating base-layer transform coefficients from said multi-layer bitstream;
   b) generating enhancement-layer residual coefficients from said multi-layer bitstream;
   c) combining said base-layer coefficients with said enhancement-layer residual coefficients to produce combined-layer coefficients;
   d) determining whether said combined-layer coefficients comprise any non-zero coefficients;
   e) when said combined-layer coefficients comprise a non-zero coefficient, encoding said combined-layer with a quantization parameter and signaling said quantization parameter with a quantization parameter identifier; and
   f) when said combined-layer coefficients do not comprise a non-zero coefficient, encoding said combined-layer with a default quantization parameter from a previous block.

10. A method as described in claim 9 further comprising scaling said base-layer transform coefficients.

11. A method as described in claim 9 further comprising using said quantization parameter or said default quantization parameter for in-loop filtering for a current portion of said bitstream.

12. A method as described in claim 9 further comprising using said quantization parameter or said default quantization parameter for signaling a quantization offset parameter for a subsequent bitstream portion.

13. A method as described in claim 10 wherein said scaling is based on quantization parameters of said base layer and said enhancement layer.

14. A method as described in claim 9 further comprising entropy coding said combined layer coefficients.

15. A method as described in claim 9 wherein said base layer and said enhancement layer are part of an SVC-compliant bitstream and said combined layer is part of an AVC-compliant bitstream.

* * * * *